United States Patent Office 3,461,111
Patented Aug. 12, 1969

3,461,111
COPPER-CONTAINING PYRAZOLONE MONOAZO DYESTUFFS
Ernst Hoyer and Fritz Meininger, Frankfurt am Main, and Walter Noll, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed May 26, 1967, Ser. No. 641,492
Claims priority, application Germany, June 4, 1966, F 49,399
Int. Cl. C09b *45/18*
U.S. Cl. 260—147                1 Claim

ABSTRACT OF THE DISCLOSURE

Copper-containing monoazo dyestuff of the formula

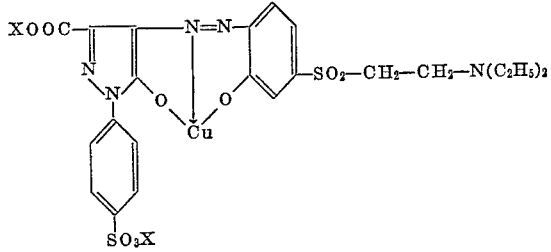

wherein X represents a hydrogen or an alkali metal atom, and process for its preparation.

---

The present invention relates to a valuable copper-containing monoazo dyestuff and to a process for its preparation; it relates especially to the dyestuff of the formula

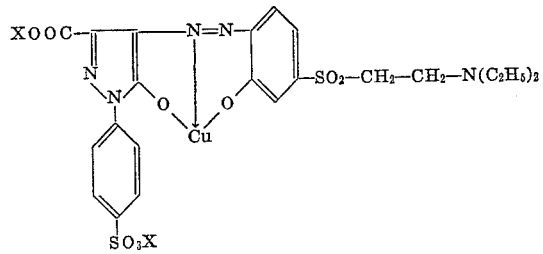

wherein X represents a hydrogen atom or an alkali metal atom, such as sodium or potassium. It has been found that the copper-containing monoazo dyestuff of the formula shown above can be prepared (a) By reacting with diethylamine in an aqueous medium, if desired under addition of alkaline agents, the copper complex dyestuff of the formula

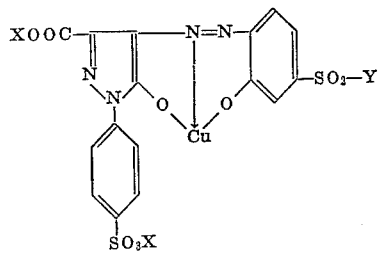

wherein Y represents a group of the formula $-CH_2-CH_2-O-SO_3X$ or of the formula $-CH=CH_2$ and X has the above-mentioned meaning, or (b) By preparing the dyestuff of the formula

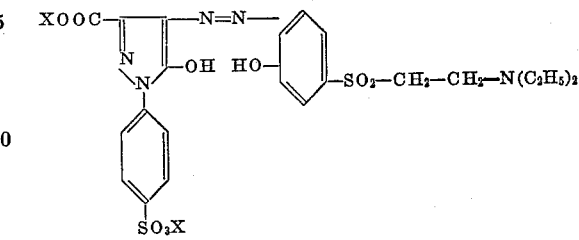

wherein X has the meaning given above, by diazotizing and coupling and by then treating it with copper-yielding agents.

When applying method (a) for the preparation of the new copper-containing monoazo dyestuff the process is suitably carried out in such a way that, when using a dyestuff containing a β-hydroxyethyl-sulfonyl-sulfuric acid ester group, an aqueous solution which contains 1 mole of this starting compound in form of the alkali metal salt, is reacted with at least 2 moles of diethylamine at normal or elevated temperature and the dyestuff obtained is then isolated by salting out, for example with sodium chloride or potassium chloride, and filtering or by spray drying of the reaction mixture.

The reaction described above may also be carried out with the same result by treating at room temperature or elevated temperature 1 mole of the starting dyestuff containing a β-hydroxyethylsulfonyl-sulfuric acid ester group, in an aqueous solution with 1 to 1.2 mole of diethylamine in the presence of an alkaline agent such for example as sodium hydroxide or potassium hydroxide sodium carbonate or potassium carbonate or trisodium phosphate.

Another way to prepare the new copper-containing monoazo dyestuff according to method (a) is to react when using a copper complex dyestuff containing a vinyl sulfonyl group, 1 mole of this starting compound in aqueous solution at room temperature or at elevated temperature with 1 to 1.1 mole of diethylamine and then separating the dyestuff by spray-drying of the solution The azo dyestuff free from metal which is necessary for the preparation of the new copper-containing monoazo dyestuff according to method (b) can be obtained by first converting the 6-(β-hydroxy-ethylsulfonyl)-benzoxazolone, known from German patent specification No 1,153,029, into the 6 - (β-diethylamino - ethylsulfonyl) benzoxazolone and by then splitting it up by treating with sulfuric acid at 135 to 150° C. to form the 1-amino-2-hydroxy - 4 - (β-diethylamino-ethylsulfonyl)-benzene. The latter is diazotized according to usual methods and couple with 1-(4'-sulfophenyl)-3-carboxy-pyrazolone-(5). The subsequent coppering of the coupling product thus obtained proceeds in known ways. Suitable copper-yielding agents are water-soluble copper salts such, for example as sulfates, chlorides, acetates, formiates or the salts of organic sulfonic acids.

The separation by salting out of the copper-containing reaction product can be promoted by adding acids, such as hydrochloric acid, sulfuric acid or acetic acid, to the reaction mixture up to a pH value of 5 to 7.

The water-soluble copper complex dyestuff obtained according to the process of the present invention may be used for dyeing cellulose materials, such as cotton, linen or viscose rayon. It is also appropriate for the dyeing of nitrogen-containing fibers of animal as well as of synthetic origin, such, for example as wool and polyamide fibers. The new dyestuff is moreover especially suitable for the printing of cellulose fibers. For this purpose it is printed in form of a thickening paste, which contains the dyestuff and an alkaline agent such, for example as sodium hydroxide, potassium hydroxide, potassium carbonate or sodium carbonate. The print is then subjected to a heat treatment, for example to a treatment with steam. The printing pastes used for the preparation of the prints which contain an alkaline agent are very resistant to the alkalies. In this respect the new dyestuff is essentially superior to the closest related dyestuff of the formula

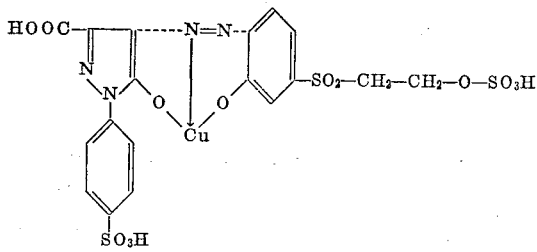

known from the German patent specification No. 1,126,542.

The dyestuff obtained according to the process of the present invention has a high tinctorial strength. It may be used for producng yellow brown dyeings and prints on cotton which prove a good fastness to washing, chlorine, water and rubbing and moreover a very good fastness to light.

The following examples serve to illustrate the present invention, but they are not intended to limit it thereto; the parts and percentages being by weight unless stated otherwise.

Example 1

130.7 parts of the dyestuff of the formula

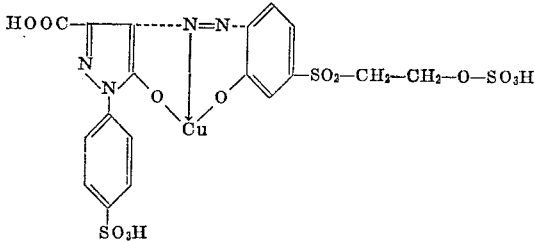

in form of the sodium salt were dissolved at about 30 to 0° C. in 1,000 parts by volume of water. The solution obtained was mixed with 16 parts of diethylamine and cooled to about 24 to 27° C. by addition of 100 parts of ice. At this temperature 24.2 parts of a sodium hydroxide solution of 33% strength were given into the reaction mixture until a pH-value of 10.2 to 10.8 was obtained. The batch was then stirred for 16 hours at 18 to 22° C. and 20% of sodium chloride (referred to the volume of the solution) were added. In order to separate the product the pH-value of the dyestuff solution was adjusted to 4-5.2 by slowly introducing 48.0 parts of hydrochloric acid of 30% strength. The precipitated dyestuff was filtered off with suction, washed with a sodium chloride solution of 15% strength and dried in vacuo at 70 to 80° C. 124.0 parts of a brown powder were obtained, which was easily soluble in water and which yielded on cotton, linen and regenerated cellulose in the presence of alkalies, such as sodium carbonate, sodium hydroxide or trisodium phosphate, yellow brown dyeings and prints of good fastness to washing, chlorine, water and rubbing and moreover of very good fastness to light.

Example 2

130.7 parts of the ester dyestuff of the formula given in Example 1, in form of the sodium salt, were dissolved in 1,000 parts by volume of water at 60 to 70° C. This solution was cooled to 40–50° C. and mixed with 32 parts of diethylamine. In order to complete the reaction, the mixture was stirred for another 16 to 20 hours at 20 to 40° C. The product was then worked up as described in Example 1. 165 parts of a dyestuff were obtained, identical to the dyestuff obtained according to Example 1.

Example 3

653.5 parts of the ester dyestuff of the formula given in Example 1 were dissolved at 65 to 70° C. in 5,000 parts by volume of water and 120 parts of anhydrous sodium carbonate were introduced at the same temperature. The reaction mixture showing an alkaline reaction (phenolphthalein) (pH-value=9.5 to 10) was stirred for 30 minutes at 60 to 70° C. Then 3,000 parts of ground ice were added, thus lowering the temperature of the batch to about 30° C. 80 parts of diethylamine were then added to the batch and the whole was stirred for 20 to 25 hours at room temperature. By addition of 1,600 parts of sodium chloride and 240 parts of hydrochloric acid of 30% strength the formed dyestuff precipitated at a pH-value of 5 to 5.2. The reaction product was filtered off with suction and washed with a sodium chloride solution of 15% strength. After drying in vacuo at 60 to 70° C., 870 parts of a brown powder were obtained, corresponding to the dyestuff prepared according to Example 1.

Example 4

555.5 parts of the dyestuff of the formula

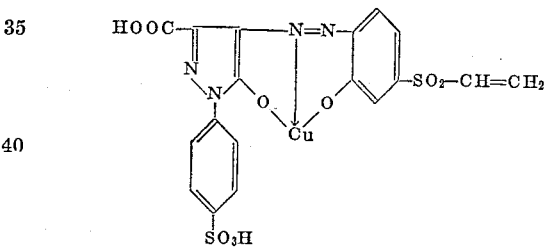

(prepared from the ester dyestuff of the formula given in Example 1 by treating it with alkali and by then precipitating it by salting out at a pH-value of 4.5 to 5.2) in form of the sodium salt were stirred in 3,000 parts by volume of water and mixed with 80 parts of diethylamine at room temperature. The dyestuff solution was stirred for another 20 hours and the product formed was isolated by spray-drying. 900 parts of a brown powder were obtained corresponding to the dyestuff prepared according to Example 1.

Example 5

243 parts of 6-(β-hydroxy-ethylsulfonyl)-benzoxazolone were added at 15° C. to 35° C. to 750 parts of sulfuric acid (of 100% strength) and stirred overnight at room temperature. The thus obtained solution was given onto 6,500 parts of ice, mixed with 125 parts of diethylamine and the pH-value was adjusted to 12–12.5 at 5° C. to 10° C. by addition of 2,200 parts of a sodium hydroxide solution of 33% strength. At this pH-value the batch was stirred for about 5 hours at 5 to 10° C. and the pH-value of the reaction mixture was then adjusted to 6.5–7 by means of dilute hydrochloric acid. The suspension obtained was filtered off and washed with water. After drying in vacuo at 60° C., 145 parts of 6-(β-diethylamino-ethylsulfonyl)-benzoxazolone which melts after recrystallization from alcohol at 161–162° C. were obtained.

*Analysis.*—$C_{13}H_{18}O_4N_2S$ (molecular weight 298). Calculated: C, 52.4%; H, 6.0%; N, 9.4%. Found: C, 52.6%; H, 6.3%; N, 9.8%.

60 parts of the 6-(β-diethylamino-ethylsulfonyl)-benzoxazolone thus obtained were added at 60 to 70° C. to 130 parts of concentrated sulfuric acid and stirred for 90 minutes at 145 to 150° C. until the carbon dioxide evolution has ceased. After cooling off, this solution was poured, while stirring, onto 400 parts of ice and then a portion of the sulfuric acid present in the mixture was neutralized at 0 to 5° C. by addition of 360 parts of a sodium hydroxide solution of 16.5% strength and of 400 parts of ice. The formed 1-amino-2-hydroxy-4-(β-diethyl-amino-ethylsulfonyl)-benzene was then diazotized with 40 parts by volume of a 5 N sodium nitrite solution, the excess nitrite was destroyed by means of some amidosulfonic acid and the solution was neutralized with 88 parts of sodium bicarbonate.

56.8 parts of 1-(4'-sulfophenyl)-3-carboxy-pyrazolone-(5) were added to the solution of the diazo component thus obtained and the pH-value of the coupling mixture was adjusted to 6.7–7 by addition of 23 parts of sodium carbonate. When the coupling was terminated and 75 parts by volume of acetic acid of 50% strength have been added to the solution of the metal free dyestuff, 50 parts of copper sulfate containing crystal water and 50 parts of crystallized sodium acetate were added and the metallization mixture was heated for 1 to 2 hours up to 50–60° C. The coppering was then terminated. The copper complex dyestuff formed was salted out with sodium chloride, filtered off with suction, washed with some sodium chloride solution of 15% strength and dried in vacuo at 50 to 60° C. 190 parts of a brown dyestuff powder were obtained, corresponding to the product prepared according to Example 1.

We claim:
1. Copper-containing mono-azo dyestuffs having the formula

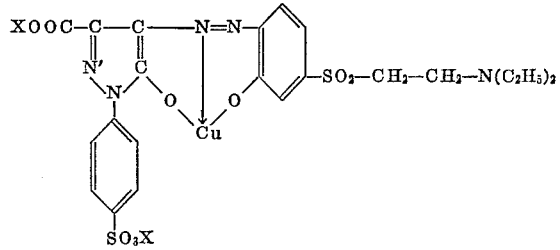

in which X represents hydrogen, sodium or potassium.

References Cited

UNITED STATES PATENTS 3,201,383   8/1965   Straley et al. _____ 260—147

FLOYD D. HIGEL, Primary Examiner

DONALD M. PAPUGA, Assistant Examiner

U.S. Cl. X.R.

8—42, 43, 54, 55, 63, 71; 260—163